May 13, 1969      I. A. CARR      3,443,628

PRESSURE DIECASTING APPARATUS AND METHOD

Filed Aug. 31, 1966

INVENTOR.
IRVING A. CARR
BY
Richard P. Crowley
ATTORNEY

United States Patent Office 3,443,628
Patented May 13, 1969

3,443,628
PRESSURE DIECASTING APPARATUS AND
METHOD
Irving A. Carr, 60 Gardner St., Hingham, Mass. 01440
Filed Aug. 31, 1966, Ser. No. 576,288
Int. Cl. B22d 27/12, 17/32, 17/00
U.S. Cl. 164—313                                    7 Claims

ABSTRACT OF THE DISCLOSURE

A diecasting apparatus which comprises upper and lower mold elements which define a casting cavity when in the closed position. Within the upper mold element is an injection chamber and an injection piston is contained therein in a close slideable fit and similarly the lower mold element contains an ejection chamber with an ejection piston contained therein in a close slideable fit. The upper mold element is adapted to reciprocate between a first opened and a second closed position and the injection piston also moves between a first and a second position. The circumferential walls of the injection piston are at all times in close contact with the internal walls of the chamber whereby the piston is continuously wiped in both directions by the action of the chamber walls when the upper mold element moves from the closed to the open position and thereafter the piston moves from the first to the second position.

---

This invention relates to diecasting of moldable materials. More precisely the invention concerns an improved pressure diecasting apparatus and method especially useful for producing high quality metallic castings in a continuous and surprisingly economical fashion particularly of aluminum castings not generally subject to pressure diecasting techniques.

Pressure diecasting techniques and apparatus for accomplishing such techniques are well-known to the art. In present commercial practice, the apparatus most commonly employed is characterized by a horizontally disposed injection chamber, usually cylindrical in form, communicating with a vertically disposed mold cavity. In practice, the moldable or castable material is introduced into the chamber and forced into the mold cavity by means of an injection piston reciprocating through said horizontal chamber.

Despite the widespread use of such diecasting techniques and apparatus, those well-skilled in the art are acutely aware of many disadvantages therein. For example, the horizontal configuration of such diecasting apparatus permits excessive gases, e.g., air to become entrapped or occluded in the moldable material during the injection thereof into the mold cavity. Accordingly, such apparatus must employ extremely high injection pressures, e.g., over 10,000 p.s.i.g. to insure the production of castings which are free of excessive porosity or other defects occasioned by entrapped gases. However, the use of such high pressure can lead to the problem of excessive flashing which oftentimes is encountered in present diecasting apparatus, and turbulent flow of material, which occludes or entraps air. In turn, excessive flashing generally implies premature sealing of the parting line between the mold halves thereby preventing the escape of air or gases from the mold cavity. Accordingly, higher injection pressures can oftentimes be a factor because of back pressure in the mold which also contributes to an undersirable degree of porosity in the ultimate casting.

Also, the horizontal configuration of present diecasting apparatus is generally regarded as highly inefficient by those well-skilled in the art. For example, the configuration requires that the mold cavity, or at least the major portion thereof, be disposed above the central axis of the reciprocating injection piston. Moreover, in present diecasting apparatus considerable down time is too often required because of unwanted sticking of the injection piston in the injection chamber or to the "biscuit," e.g., that portion of the casting which is formed in the injection chamber. In view of the above, an improved pressure diecasting apparatus which by reason of its structural features and functions can inherently overcome all or some of the disadvantages implicit in present apparatus would be a notable contribution to the art.

A principal object of the present invention is to provide improved pressure diecasting apparatus and method.

Another object of the present invention is to provide pressure diecasting apparatus which is inherently capable of producing castings of improved integrity and quality.

Still another object of the present invention is to provide pressure diecasting apparatus which can produce castings in a continuous, uninterrupted fashion.

A further object of the present invention is to provide pressure diecasting apparatus which can produce castings which are substantially free of porosity from a moldable material consisting essentially of metal. In accordance with this aspect of my invention I can, for example, produce high purity aluminum castings which can be subsequently anodized.

Other objects and advantages of the present invention will in part appear hereinafter or will in part be apparent to those well-skilled in the art.

The above objects and advantages are realized in accordance with the practice of the present invention by a pressure diecasting apparatus characterized by a unique combination of structural elements all of which cooperate in an integrated fashion to provide pressure diecasting apparatus and a method which can inherently produce high quality castings essentially free of porosity in an efficient continuous fashion.

One preferred method of operating my apparatus comprises a two-stage, pressure injection cycle wherein the molding material is first subjected to a relatively low pressure, generally less than 500 p.s.i.g., and thereafter to a high pressure, generally greater than 500 p.s.i.g., but usually much less than the pressure ordinarily required in conventional prior art processes employing the same material for a casting of similar quality. For example, in the preparation of metal castings I have found that the use of a single, high pressure injection cycle often and typically creates a turbulent flow of the liquid metal into the cavity and against the parting line of the mold, which flow occludes air or other gases within the casting. Further, the high pressure used tends to throw the liquid metal against the internal walls of the cavity where it cools and inhibits the escape of gases or air entrapped within the inner portions of the cavity and material. Accordingly, the low pressure should be selected to effect the essentially non-turbulent flow of the molding material into the cavity, and in any event to permit the escape of all or a substantial part of the entrapped gases in the cavity. The injecting of molten metal into the die cavity may be carried out at the low temperature of not more than about 50° F. above the arrest point. The pressure and rate of injection may, of course, vary depending upon the metal, the temperature, and other factors known to those skilled in the casting art. The high pressure generally should be selected to forge and complete the casting operation after the filling or substantial filling of the cavity under low pressure, and to attain a casting of the proper density and of the desired quality. The use of the low pressure permits a lower high pressure to be used, since the amount of back pressure due to entrapped air or gases and flow resistance of the material is considerably less in my two or multiple cycle pressure injection process. The time and rate at which the high pressure cycle should be commenced may be determined by observing, detecting, measuring or otherwise determining the back pressure within the cavity. The high pressure application should be started in sufficient time so that there is a gradual and smooth transition from the low to the high pressure for the best results.

One embodiment of apparatus of the present invention comprises a vertical injection chamber which is preferably open at both ends. In turn, the injection chamber consists of two elementary chambers, an upper and lower chamber, separated by a horizontal joint connecting the chamber to a horizontally disposed mold cavity which comprises upper and lower mold halves separated by a horizontal parting line. In the apparatus of the present invention, the upper mold half is operationally connected with means to retract the upper mold half from the lower mold half through a predetermined distance.

The lower chamber is fixed to the lower mold half and closure means are provided in said lower chamber. The closure means comprise a reciprocal shaft or piston of approximately the same cross sectional shape and area as the internal cross-section of the chamber. The upper chamber is fixed to the upper retractable mold half and is provided with a reciprocal injection shaft. A portion of the length of the leading edge of said shaft is of approximately the same cross-sectional shape and area as the internal cross-section of the upper chamber. The overall length of the injection shaft which is of approximately the same cross-sectional area and shape is especially critical in the apparatus of the present invention and the length thereof is at least as great, but preferably greater than the predetermined distance through which the upper mold is retracted from the lower mold half. The injection piston, therefore, always remains within the upper sleeve during the molding cycle except it is removed above the closed mold for the charging of the material to the upper chamber. This ensures continuous, uninterrupted, automatic operation of my apparatus and avoids the difficulties connected with continual reposition of pistons using snap-on devices.

The vertical configuration of the apparatus of the present invention has many outstanding advantages over the horizontal configuration of prior art pressure casting apparatus. For example, in charging moldable material to a vertical injection chamber, very little, if any, air can be entrapped or occluded in the charge. Instead, air is displaced from the chamber as the material is charged thereto, thereby significantly reducing the possibilities of excessive porosity in the final casting. Also, quite surprisingly, I have found that castings produced in apparatus employing a vertical configuration can have significantly less residual metal or scrap associated therewith than castings produced in apparatus employing a horizontal configuration by virtue of the short distance of material travel to fill the mold. For example, the casting produced in my apparatus in contrast to horizontal casting devices can represent a significantly greater percentage of the original charge of moldable material to the injection chamber. Occluded gases typically require substantial overflow welds which increases the percentage of scrap in conventional devices, while my apparatus permits significantly reduced or no overflow welds.

Another outstanding advantage of my vertical configuration is that alloys of high purity can be employed to produce anodizable castings. For example, anodizable castings of aluminum and aluminum alloys can be produced in the apparatus of the present invention as well as castings of iron, brass, magnesium, and the like.

One of the major differences in the operation between the apparatus of U.S. Patent 3,038,220 and mine is that my apparatus is characterized by non-sticking and continuous operation, that is to say, each casting cycle which includes the injection of the moldable material into the cavity and the extraction of the finished casting therefrom, can be continuously repeated without interruption. In contrast thereto, the apparatus of U.S. Patent 3,038,220 is not continuous, but instead each cycle must be interrupted after extraction of the casting from the mold in order to detach the injection piston from the injection shaft oftentimes because the casting is stuck thereto, or to clean the piston of any moldable material which can adhere to the circumferential portion thereof. However, in my apparatus, such interruptions are unnecessary and my apparatus can be operated in a continuous fashion, since the novel features thereof not only provide means for repeated cleaning or wiping of the circumference portion of the injection shaft, but also said features assure that said shaft will not gall or solder in the injection chamber.

My invention will be better understood with reference to the attached drawings which illustrate especially preferred arrangements of apparatus suitable for accomplishing the purposes of the present invention.

Figure 1:
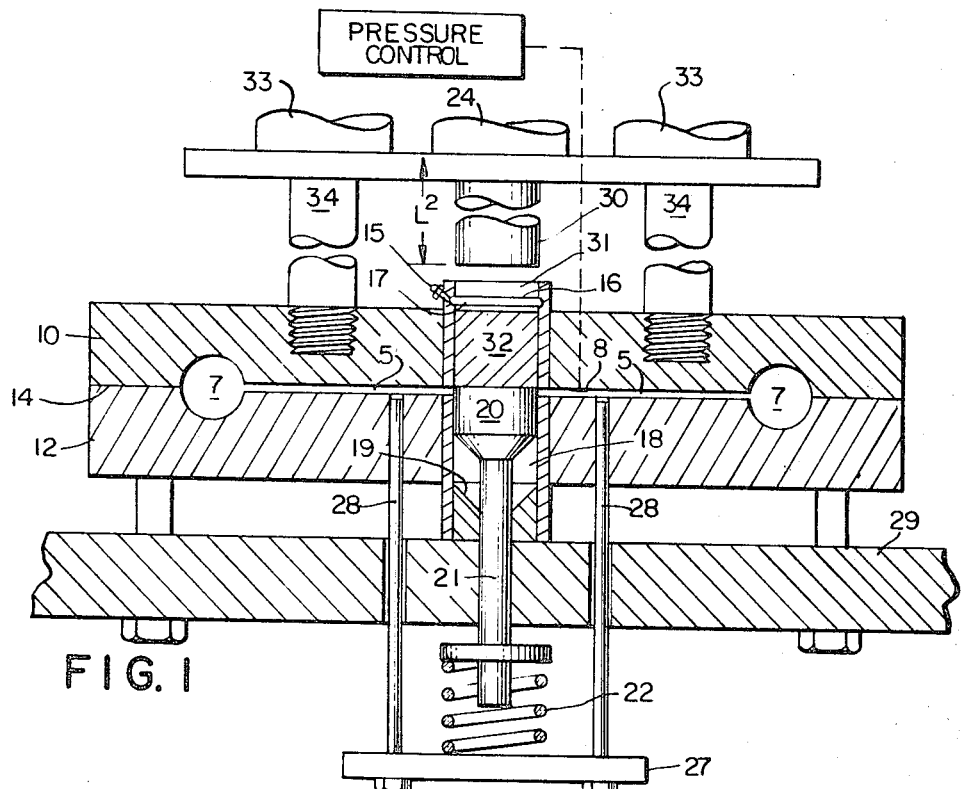
FIG. 1 is a diagrammatic vertical axial section of my apparatus where the parts are shown in their positions before the injection step, the moldable material being shown in the upper portion of the injection cylinder.

Referring now particularly to FIG. 1, there is shown upper and lower mold halves 10 and 12 respectively, separated by horizontal parting line 14. Mold halves 10 and 12 form a series of mold cavities 7 connected to and about the central vertical injection chamber 31 by feed passages 5. Generally, the openings of feed passages 5 are disposed radially about the inner cross section of chamber 31, so that residual moldable material remaining therein after the casting has set will form an integral part of the ultimate casting in the form of arms radiating from the biscuit formed in chamber 31. Vertical injection chamber 31 comprises upper chamber 16 fixed to upper mold half 10, so that the lower edges of chamber 16 are flush with the lower surface of upper half 10. Upper chamber 16 is characterized by an inner recessed annulus 17 about the upper portion of the chamber and a nipple 15 for the introduction of a lubricant to the annulus 17 for lubricating of the piston 20 during the cycling operation. Lower chamber 18 is fixed to lower mold half 12 and the upper edges of chamber 18 are flush with the upper surface of mold half 12. As shown, closure means comprises a valve 20 connected to reciprocating means 22 shown as a coiled spring. Reciprocating means 22 permits closure means 20 to move from a first position in chamber 31 wherein feed passages 5 are disconnected from chamber 31 to a second position in which feed passages 5 are connected to chamber 31. A pressure detecting or sensing element 8 is shown within cavity 7 to indicate the cavity pressure during operation. This detecting means communicates to and controls the pressure applied by reciprocating means 24.

Valve 20 is slidably mounted in a valve chamber containing a tapered or shaped valve seat 19 against which seat the valve 20 moves and snugly fits during the injecting or casting cycle. Valve shaft 21 is secured to reciprocating means 22, mounted on an ejector plate 27 containing ejector pins 28 and extending upwardly into ejector chambers in the lower mold half 12. The lower end of valve shaft 21 is positioned a set distance from the ejector plate 27 so that when the valve 20 is rested in the valve seat 19, the end of valve shaft 21 is against ejector plate 27. Thus, the distance from the one end of the valve shaft 21 and the ejector plate 27 should be the same as the distance valve 20 moves to become firmly rested in valve seat 19. This arrangement prevents bounce of the valve 20 during operation, permits the use of increased injection pressures, and reduces the projected molding area relative to the closing pressure needed to close the mold.

The ejection means comprises ejector pins 28 which are adapted for slidable movement through a support or base plate 29 securely mounted to the lower mold half 12 and to the ground (not shown). A ram means 26 is provided to move the ejector plate 27 and pins 28 upward for extraction of the set casting from the lower mold half 12, and to move the valve shaft 21 upward to aid in the ejection process.

Injection piston 30 is shown disposed outside upper chamber 16 so that moldable material 32 can be introduced to chamber 31. Moldable material 32 can be introduced to chamber 31 by ladling or by other techniques known to the art which need not necessarily require that piston 30 be completely removed from the confines of chamber 16. Piston 30 is connected to suitable reciprocating means 24 which is not illustrated in detail since features of such means are well-known to the art. A length of the leading portion of piston 30 represented by L2 is of approximately the same cross sectional shape and area as the internal cross section of chamber 16, so that at least that portion of piston 30 represented by L2 can provide a close but slidable, fluid-tight fit in upper chamber 16. Rods 34 which are securely attached to upper mold half 12 are operationally connected with suitable reciprocating means 33 to retract upper mold 10 from lower half 12 through a predetermined distance such as to a position represented by parting line P—P. The parting line P—P of the moving upper half of the mold should not be above the maximum length of the injection piston 30 during the operating cycle. In operation the upper mold 10 moves first to the open P—P position and then the piston 30 can move to the distance desired.

In operation a moldable material such as a molten aluminum alloy is ladled into the upper injection chamber 16 with the apparatus shown as in FIG. 1.

Figure 2:
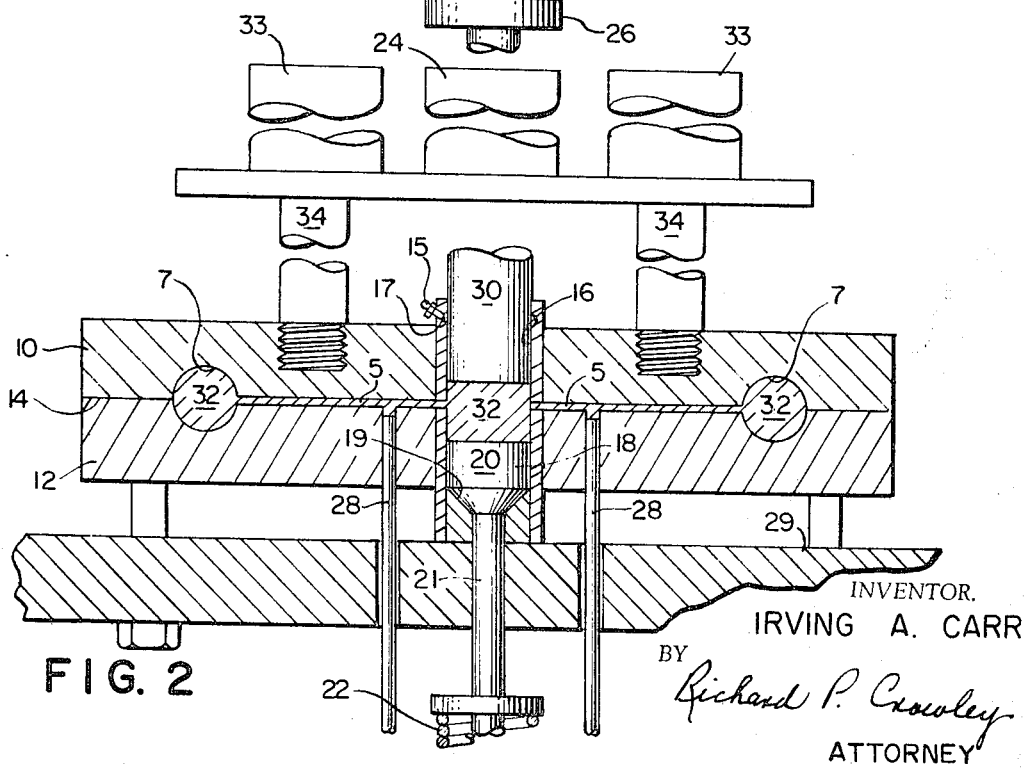
FIG. 2 is another section corresponding to FIG. 1, but showing the parts in their positions after the injection of the moldable material into the mold cavity.

Referring now to FIG. 2, injection piston 30 has moved downwardly to inject the moldable material 32, which can be an anodizable alloy, into cavities 7. In my preferred apparatus reciprocating means 24 can apply two different pressures to piston 30 in the injection step. Initially, a low injection pressure is applied to piston 30, whereby cavities 7 are filled with moldable material 32 without turbulence and at a reduced velocity, so that any gases in the cavities can be freely vented through parting line 14. In such a fashion, a peripheral seal is formed in cavities 7 with a minimum of flashing. The pressure initially applied to piston 30 will vary depending primarily upon the particular moldable material involved. However, for illustrative purposes, pressures between about 400 p.s.i. to about 500 p.s.i., or somewhat higher can be employed for example, with molten metal like an aluminum-magnesium anodizable high strength corrosion-resistant alloy such as Almag 35. When cavities 7 are filled with moldable material 32, a pressure detection device 8, such as pressure switch 8 shown, actuates means 24 to apply a higher injection or forging pressure on piston 30. Suitable high injection pressures can vary but generally pressures in the range of from 1000 p.s.i. to 1500 p.s.i., can be employed. Those well-skilled in the art will readily recognize that the above range of suitable injection pressures is considerably lower than injection pressures generally or presently employed in pressure diecasting apparatus for these metals. However, in accordance with this preferred method of operation, I am able to produce castings of high density and extremely low porosity which are features especially required in castings of anodizable alloys in order to assure the application of a uniform anodized finish thereon. The low and high pressures are imparted as shown by a single piston 30. However, if desired a piston within a piston arrangement may be employed so that one piston is used for low pressure and the other or both used for the high pressure step.

On application of the low pressure by piston 30, valve 20 is depressed below the horizontal parting line 14 and against the valve seat 19, with one end of the valve shaft moved against ejector plate 27, whereby upon application of the high pressure, valve 20 is secure, and increased pressure without bounce or movement of valve 20 can be accomplished. Of course, the operation of the reciprocating means for the piston 30, mold halves, and the valve can be controlled by limit switches set at the proper distances to actuate the means, thereby providing automatic and continuous operation.

Figure 3:
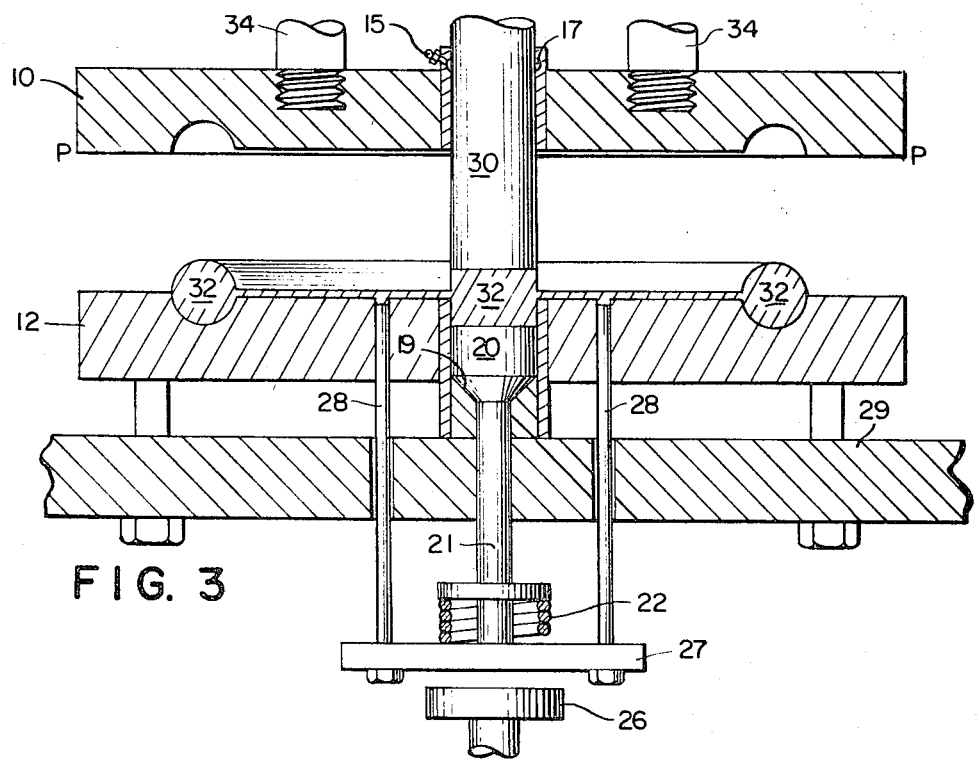
FIG. 3 is a view similar to FIGS. 1 and 2 showing the parts in their first positions before extraction of the set casting.
Figure 4:
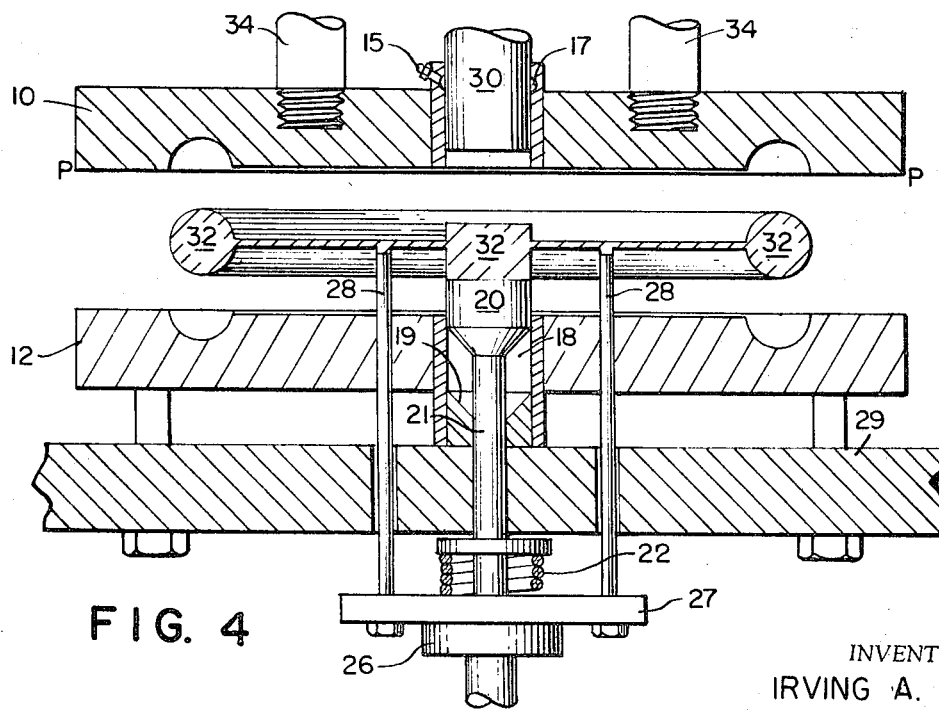
FIG. 4 is a view similar to FIGS. 1, 2 and 3 showing the position of the parts on ejection of the set casting.

FIGS. 3 and 4 illustrate the manner of extracting or ejecting the castings formed in the apparatus of the present invention. After the casting is set, the high injection pressure is maintained on injection piston 30 and retraction means 33 is actuated to retract upper mold half 10 together with upper chamber 16 from lower mold half 12 through a predetermined distance such as to the position represented by parting line P—P. It will be apparent that even in said retracted position, upper chamber 16 is in communication with at least a portion of the leading edge of injection piston 30 which is of approximately the same cross sectional shape and area as the internal cross section of chamber 16. In the preferred practice of my invention, injection piston 30 is next withdrawn from the injection position through the lower edge of upper chamber 16. Simultaneous with or after the withdrawal of shaft 30, ram means 26 is actuated and drives against ejector plate 27, which in turn causes ejector pins 28 and valve shaft 21 and valve 20 to move upwardly and eject the set casting from lower mold half 12. It will be readily apparent that if the biscuit should stick to injection piston 30, then the biscuit and casting will be dislodged therefrom as piston 30 is withdrawn through chamber 16. After the metal has been injected and a set casting formed, the upper piston 30 remains in place to hold the biscuit down, while the upper mold half 10 moves to the open position P—P or open position. Then the piston 30 moves upwardly through mold half 10 and upper injection chamber 16 where its piston walls are wiped by contact with the injection chamber walls. After this cycle the mold half 10 can be moved to any position. This operation permits positive holding of the biscuit by piston 30 when the mold is opened, while the ejector means (pins 28 and valve 20) provide positive ejection of the casting from the lower mold half 12. Moreover, any residual metal that may have flashed on or otherwise adhered to the outer circumferential portion of injection shaft 30 will be readily wiped therefrom as shaft 30 is withdrawn through upper chamber 16.

My invention also permits efficient lubrication of the upper injection chamber 16 and piston 30 during operation without contamination of the mold material or interruption of operation. In horizontal type pressure injection apparatus lubricant often tends to puddle at the bottom or lower portion of the injection piston rather than to form a thin film about the piston. This lubricant may come into contact with the molding material and particularly with a molten metal cause contamination. My apparatus permits uniform, thin film lubrication of the entire piston and prevents lubricant from contacting the molding material. In my apparatus and method a lubricant such as graphite may be introduced through nipple 15 into annulus 17 when the injection piston is in an injection position (FIG. 2) or during injection so that the lubricant is spread or wiped on movement onto the walls of the injection chamber 16 and on the piston walls.

It will be apparent that after the casting has been extracted, my apparatus is immediately ready for another casting cycle without any interruptions such as disengaging either the injection piston 30 or lower valve 20. Accordingly, my apparatus and method present a vertical pressure diecasting apparatus which obtains all the advantages of such a vertical configuration and which can be operated in a continuous fashion to produce castings of unexpectedly high quality. Although my apparatus has been described in conjunction with my preferred two-pressure method of operating, my apparatus may likewise be employed for simple or multiple pressure injection operations where desired.

Many modifications in the features offered above for the purposes of illustrating my invention can be employed therein without departing from the spirit and scope of the invention defined in the appended claims.

For example, my principles may be applied to various diecasting apparatus and can be used with inclined or biased pressure diecasting apparatus.

Having defined my invention, together with preferred embodiments thereof, as well as manners of practicing same, what I declare as new and desire to secure by U.S. Letters Patent is as follows:

1. An improved diecasting apparatus which comprises:
   an upper mold element and a lower mold element which elements define a casting cavity when placed in a closed position, the upper mold element characterized by an upper chamber containing an injection piston,
   the upper mold element adapted to be moved from a closed position through a predetermined vertical distance to an open position, the injection piston adapted to be moved between a first lower position to inject metal into the casting cavity and a second upper position to permit the introduction of a new metal charge to the mold elements in the closed position, the injection piston being closely fitted within the upper chamber through a length at least equal to the distance through which the upper mold element is moved from its closed to its open position, the piston face being the only portion thereof against the molten metal charge during the injecting of the metal into the cavity, the circumferential side of the injection piston being wiped free of metal by the chamber walls when the upper mold element is withdrawn from the closed position, and the circumferential side of the injection piston being wiped a second time when the injection piston is withdrawn from its first position to its second position,
   the lower mold element is characterized by a lower chamber containing an ejection piston, the ejection piston adapted to move in a close fitting manner in the lower chamber from a first position to prevent the metal charge from entering the casting cavity and a second lower position to permit the introduction of the molten metal into the casting cavity,
   the upper and lower chambers comprising an injection chamber which injection chamber communicates with the casting cavity, and
   control means to provide for the sequential movement of the injection piston from its second to its first position to inject molten metal into the casting cavity, the movement of the upper mold element from its closed to its open position thereby wiping the circumferential walls of the injection piston in an upwardly direction and thereafter the movement of the injection piston from its first to its second position whereby the circumferential walls of the injection piston are wiped in a downwardly direction.

2. The apparatus of claim 1 further including means to reciprocate said ejection piston between the first position in which said piston disconnects said cavity from said injection chamber to a second position in which said cavity is connected to said injection chamber.

3. The apparatus of claim 1 wherein the lower portion of the ejection piston is shaped and the piston moves from the first position to the second position against a shaped valve seat.

4. The apparatus of claim 1 further including means to eject any casting formed between said mold elements from said lower mold element.

5. The apparatus of claim 1 wherein the control means to reciprocate said injection piston includes means to apply a first and second pressure to said piston, said first pressure being substantially lower in magnitude than said second pressure.

6. The apparatus of claim 5 further including sensing means to detect when said cavity is filled with moldable material as said piston is advanced from the second position under said first pressure and said control means can apply said second pressure to said piston in response to said sensing means.

7. The apparatus of claim 1 which includes means to lubricate the injection piston as it moves in the injection chamber, which means comprises an upper injection chamber characterized by an annular, recessed opening about the inner wall of the chamber and above the molding material introduced into the chamber, and means to introduce a lubricant into this opening.

References Cited

UNITED STATES PATENTS

| 1,717,254 | 6/1929 | Polak | 164—120 X |
| 1,961,941 | 6/1934 | Pack | 164—113 |
| 2,519,739 | 8/1950 | Butnik | 164—314 |
| 2,786,234 | 3/1957 | Beyer | 164—154 X |
| 2,847,739 | 8/1958 | Sylvester | 164—119 |
| 3,038,220 | 6/1962 | Saives | 164—313 |
| 3,270,383 | 9/1966 | Hall et al. | 164—120 |

FOREIGN PATENTS

| 953,647 | 12/1956 | Germany. |
| 475,541 | 11/1937 | Great Britain. |
| 924,494 | 4/1963 | Great Britain. |
| 981,654 | 1/1965 | Great Britain. |
| 128,985 | 2/1957 | U.S.S.R. |

J. SPENCER OVERHOLSER, *Primary Examiner.*

R. S. ANNEAR, *Assistant Examiner.*

U.S. Cl. X.R.

18—30